(12) United States Patent
Nathan

(10) Patent No.: US 6,901,322 B1
(45) Date of Patent: May 31, 2005

(54) METHOD OF PREDICTING AN EMPTY SEAT CONDITION IN AN OCCUPANCY SENSING SYSTEM

(75) Inventor: John F. Nathan, White Lake Township, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/748,355

(22) Filed: Dec. 30, 2003

(51) Int. Cl.$^7$ .............................................. B60R 22/00
(52) U.S. Cl. ......................................... 701/46; 701/45
(58) Field of Search ............................ 701/45, 46, 36; 280/733, 735; 180/268, 272

(56) References Cited

U.S. PATENT DOCUMENTS

| | | | |
|---|---|---|---|
| 5,377,108 A | 12/1994 | Nishio | 364/424.05 |
| 5,404,128 A | 4/1995 | Ogino et al. | 340/425.5 |
| 5,413,378 A | 5/1995 | Steffens, Jr. et al. | 280/735 |
| 5,474,327 A | * 12/1995 | Schousek | 280/735 |
| 5,485,000 A | 1/1996 | Schneider | 235/494 |
| 5,570,903 A | 11/1996 | Meister et al. | 280/735 |
| 5,583,771 A | 12/1996 | Lynch et al. | 364/424.045 |
| 5,594,222 A | 1/1997 | Caldwell | 200/600 |
| 5,653,462 A | 8/1997 | Breed et al. | 280/735 |
| 5,684,701 A | 11/1997 | Breed | 364/424.055 |
| 5,694,320 A | 12/1997 | Breed | 364/424.055 |
| 5,731,781 A | 3/1998 | Reed | 342/135 |
| 5,739,757 A | 4/1998 | Gioutsos | 340/667 |
| 5,748,473 A | 5/1998 | Breed et al. | 364/424.055 |
| 5,810,392 A | 9/1998 | Gagnon | 280/735 |
| 5,822,707 A | 10/1998 | Breed et al. | 701/49 |
| 5,829,782 A | 11/1998 | Breed et al. | 280/735 |
| 5,835,613 A | 11/1998 | Breed et al. | 382/100 |
| 5,848,802 A | 12/1998 | Breed et al. | 280/735 |
| 5,877,677 A | * 3/1999 | Fleming et al. | 340/436 |
| 5,890,758 A | 4/1999 | Pone et al. | 297/15 |
| 5,901,978 A | 5/1999 | Breed et al. | 280/735 |
| 5,931,254 A | 8/1999 | Loraas et al. | 180/272 |
| 5,931,527 A | 8/1999 | D'Onofrio et al. | 297/146 |
| 5,943,295 A | 8/1999 | Varga et al. | 367/99 |
| 5,954,398 A | 9/1999 | Namba et al. | 297/257 |
| 5,971,432 A | 10/1999 | Gagnon et al. | 280/735 |
| 5,975,612 A | 11/1999 | Macey et al. | 296/66 |
| 6,012,007 A | 1/2000 | Fortune et al. | 701/45 |
| 6,020,812 A | 2/2000 | Thompson et al. | 340/438 |
| 6,027,138 A | 2/2000 | Tanaka et al. | 280/735 |
| 6,030,038 A | 2/2000 | Namba et al. | 297/257 |
| 6,039,139 A | 3/2000 | Breed et al. | 180/271 |
| 6,043,743 A | 3/2000 | Saito et al. | 340/562 |

(Continued)

FOREIGN PATENT DOCUMENTS

| | | |
|---|---|---|
| EP | 0 689 967 A1 | 3/1996 |
| WO | WO 98/41424 | 3/1997 |

*Primary Examiner*—Richard M. Camby
*Assistant Examiner*—Christine M. Behncke
(74) *Attorney, Agent, or Firm*—Bill Panagos; Bliss McGlynn, P.C.

(57) ABSTRACT

A method of predicting an empty seat condition for a vehicle seat having an occupancy sensing system with a sensor array assembly. The method includes determining a first resultant value based on the change between the differences among a first series of sensor readings taken from the sensor array over a predetermined period of time, and determining a second resultant value based on the change between the differences among a second series of sensor readings taken over a different predetermined period of time. The first and second resultant values are summed and if the summed value is negative the change in the first and second resultant values is calculated in terms of time to determine if it is greater than a predetermined value. Further, the the vehicle seat is classified as empty if the summed value is negative and calculated change is greater than the predetermined amount.

16 Claims, 6 Drawing Sheets

U.S. PATENT DOCUMENTS

| | | | |
|---|---|---|---|
| 6,045,405 A | 4/2000 | Geltsch et al. | 439/620 |
| 6,056,079 A | 5/2000 | Cech et al. | 180/273 |
| 6,059,358 A | 5/2000 | Demick et al. | 297/188.04 |
| 6,078,854 A | 6/2000 | Breed et al. | 701/49 |
| 6,079,763 A | 6/2000 | Clemente | 296/65.05 |
| 6,081,757 A | 6/2000 | Breed et al. | 701/45 |
| 6,088,640 A | 7/2000 | Breed | 701/45 |
| 6,089,641 A | 7/2000 | Mattarella et al. | 296/64 |
| 6,101,436 A | 8/2000 | Fortune et al. | 701/45 |
| 6,102,463 A | 8/2000 | Swanson et al. | 296/37.15 |
| 6,116,639 A | 9/2000 | Breed et al. | 280/735 |
| 6,129,168 A | 10/2000 | Lotito et al. | 180/273 |
| 6,129,404 A | 10/2000 | Mattarella et al. | 296/65.09 |
| 6,134,492 A | 10/2000 | Breed et al. | 701/49 |
| 6,138,067 A | 10/2000 | Cobb et al. | 701/45 |
| 6,141,432 A | 10/2000 | Breed et al. | 382/100 |
| 6,168,198 B1 | 1/2001 | Breed et al. | 280/735 |
| 6,186,537 B1 | 2/2001 | Breed et al. | 280/735 |
| 6,220,627 B1 | 4/2001 | Stanley | 280/735 |
| 6,234,519 B1 | 5/2001 | Breed | 280/735 |
| 6,234,520 B1 | 5/2001 | Breed et al. | 280/735 |
| 6,242,701 B1 | 6/2001 | Breed et al. | 177/144 |
| 6,250,671 B1 | 6/2001 | Osmer et al. | 280/735 |
| 6,250,672 B1 | 6/2001 | Ryan et al. | 280/735 |
| 6,253,134 B1 | 6/2001 | Breed et al. | 701/49 |
| RE37,260 E | 7/2001 | Varga et al. | 367/99 |
| 6,254,127 B1 | 7/2001 | Breed et al. | 280/735 |
| 6,270,116 B1 | 8/2001 | Breed et al. | 280/735 |
| 6,279,946 B1 | 8/2001 | Johnson et al. | 280/734 |
| 6,283,503 B1 | 9/2001 | Breed et al. | 280/735 |
| 6,323,444 B1 | 11/2001 | Aoki | 177/144 |
| 6,324,453 B1 | 11/2001 | Breed et al. | 701/45 |
| 6,325,414 B2 | 12/2001 | Breed et al. | 280/735 |
| 6,330,501 B1 | 12/2001 | Breed et al. | 701/49 |
| 6,342,683 B1 | 1/2002 | Aoki et al. | 177/144 |
| 6,353,394 B1 | 3/2002 | Maeda et al. | 340/667 |
| 6,393,133 B1 | 5/2002 | Breed et al. | 382/100 |
| 6,394,490 B2 | 5/2002 | Osmer et al. | 280/735 |
| 6,397,136 B1 | 5/2002 | Breed et al. | 701/45 |
| 6,407,347 B1 | 6/2002 | Blakesley | 177/144 |
| 6,412,813 B1 | 7/2002 | Breed et al. | 280/735 |
| 6,416,080 B1 | 7/2002 | Gillis et al. | 280/735 |
| 6,422,595 B1 | 7/2002 | Breed et al. | 280/735 |
| 6,442,465 B2 | 8/2002 | Breed et al. | 701/45 |
| 6,442,504 B1 | 8/2002 | Breed et al. | 702/173 |
| 6,445,988 B1 | 9/2002 | Breed et al. | 701/45 |
| 6,452,870 B1 | 9/2002 | Breed et al. | 367/99 |
| 6,457,545 B1 | 10/2002 | Michaud et al. | 180/272 |
| 6,474,739 B1 | 11/2002 | Lagerweij | 297/341 |
| 6,476,514 B1 | 11/2002 | Schondorf | 307/10.1 |
| 6,506,069 B2 | 1/2003 | Babala et al. | 439/248 |
| 6,532,408 B1 | 3/2003 | Breed | 701/45 |
| 6,605,877 B1 | 8/2003 | Patterson et al. | 307/10.1 |
| 6,609,054 B2 | 8/2003 | Wallace | 701/45 |
| 6,615,122 B1 | 9/2003 | Yamashita | 701/45 |
| 6,640,175 B2 * | 10/2003 | Vos et al. | 701/45 |
| 2002/0003345 A1 | 1/2002 | Stanley et al. | 280/735 |
| 2002/0056975 A1 | 5/2002 | Yoon et al. | 280/735 |
| 2002/0079728 A1 | 6/2002 | Tame | 297/344.1 |
| 2002/0098730 A1 | 7/2002 | Babala et al. | 439/248 |
| 2002/0195807 A1 | 12/2002 | Ishida | 280/735 |
| 2003/0040858 A1 | 2/2003 | Wallace | 701/45 |
| 2003/0071479 A1 | 4/2003 | Schaller et al. | 296/136 |
| 2003/0090133 A1 | 5/2003 | Nathan et al. | 297/217.3 |
| 2003/0106723 A1 | 6/2003 | Thakur et al. | 177/144 |
| 2003/0111276 A1 | 6/2003 | Kajiyama | 177/144 |
| 2003/0164715 A1 | 9/2003 | Lester | 324/661 |
| 2003/0171036 A1 | 9/2003 | Aujla et al. | 439/660 |
| 2003/0189362 A1 | 10/2003 | Lichtinger et al. | 297/217.3 |
| 2003/0196495 A1 | 10/2003 | Saunders et al. | 73/862.041 |
| 2003/0220766 A1 | 11/2003 | Saunders et al. | 702/173 |

* cited by examiner

METHOD OF PREDICTING AN EMPTY SEAT CONDITION IN AN OCCUPANCY SENSING SYSTEM

BACKGROUND OF THE INVENTION

1. Field of the Invention

The present invention relates, generally to a method of determining when a vehicle seat has become unoccupied and, more specifically, to a method of early prediction of an empty seat condition for a vehicle seat having an occupancy sensing system.

2. Description of the Related Art

Automotive vehicles employ seating systems that accommodate the passengers of the vehicle. The seating systems include restraint systems that are calculated to restrain and protect the occupants in the event of a collision. The primary restraint system commonly employed in most vehicles today is the seatbelt. Seatbelts usually include a lap belt and a shoulder belt that extends diagonally across the occupant's torso from one end of the lap belt to a mounting structure located proximate to the occupant's opposite shoulder.

In addition, automotive vehicles may include supplemental restraint systems. The most common supplemental restraint system employed in automotive vehicles today is the inflatable airbag. In the event of a collision, the airbags are deployed as an additional means of restraining and protecting the occupants of the vehicle. Originally, the supplemental inflatable restraints (airbags) were deployed in the event of a collision whether or not any given seat was occupied. These supplemental inflatable restraints and their associated deployment systems are expensive and over time this deployment strategy was deemed not to be cost effective. Thus, there became a recognized need in the art for a means to selectively control the deployment of the airbags such that deployment occurs only when the seat is occupied.

Partially in response to this need, vehicle safety systems have been proposed that include vehicle occupant sensing systems capable of detecting whether or not a given seat is occupied. The systems act as a switch in controlling the deployment of a corresponding air bag. As such, if the occupant sensing device detects that a seat is unoccupied during a collision, it can prevent the corresponding air bag from deploying, thereby saving the vehicle owner the unnecessary cost of replacing the expended air bag.

Furthermore, many airbag deployment forces and speeds have generally been optimized to restrain one hundred eighty pound males because the one hundred eighty pound male represents the mean average for all types of vehicle occupants. However, the airbag deployment force and speed required to restrain a one hundred eighty pound male exceeds that which are required to restrain smaller occupants, such as some females and small children. Thus, there became a recognized need in the art for occupant sensing systems that could be used to selectively control the deployment of the airbags when a person below a predetermined weight occupies the seat.

Accordingly, other vehicle safety systems have been proposed that are capable of detecting the weight of an occupant. In one such air bag system, if the occupant's weight falls below a predetermined level, then the system can suppress the inflation of the air bag or will prevent the air bag from deploying at all. This reduces the risk of injury that the inflating air bag could otherwise cause to the smaller-sized occupant.

Also, many airbag deployment forces and speeds have generally been optimized to restrain a person sitting generally upright towards the back of the seat. However, the airbag deployment force and speed may inappropriately restrain a person sitting otherwise. Thus, there became a recognized need in the art for a way to selectively control the deployment of an airbag depending on the occupant's sitting position.

Partially in response to this need, other vehicle safety systems have been proposed that are capable of detecting the position of an occupant within a seat. For example, if the system detects that the occupant is positioned toward the front of the seat, the system will suppress the inflation of the air bag or will prevent the air bag from deploying at all. This reduces the risk of injury that the inflating air bag could otherwise cause to the occupant. It can be appreciated that these occupant sensing systems provide valuable data, allowing the vehicle safety systems to function more effectively to reduce injuries to vehicle occupants.

One necessary component of each of the known systems discussed above includes some means for sensing the presence of the vehicle occupant in the seat. One such means may include a sensor device supported within the lower seat cushion of the vehicle seat. For example, U.S. published patent application having U.S. Ser. No. 10/249,527 and Publication No. US2003/0196495 A1 filed in the name of Saunders et al. discloses a method and apparatus for sensing seat occupancy including a sensor/emitter pair that is supported within a preassembled one-piece cylinder-shaped housing. The housing is adapted to be mounted within a hole formed in the seat cushion and extending from the B-surface toward the A-surface of the seat cushion. The sensor/emitter pair supported in the housing includes an emitter that is mounted within the seat cushion and spaced below the upper or A-surface of the seat cushion. In addition, the sensor is also supported by the housing within the seat cushion but spaced below the emitter. The cylindrical housing is formed of a compressible, rubber-like material that is responsive to loads placed on the upper surface of the seat cushion. The housing compresses in response to a load on the seat cushion. The load is detected through movement of the emitter toward the sensor as the housing is compressed. The housing is sufficiently resilient to restore the emitter to full height when no load is applied to the upper surface of the seat cushion. The Saunders et al. system also includes a processor for receiving the sensor signals and interpreting the signals to produce an output to indicate the presence of an occupant in the seat.

Generally speaking, to perform pattern recognition and classification of a physical presence that occupies a vehicle seat, the sensors are arranged into a grid, or an array so that the sensors are collectively used to provide the raw input data as a depression pattern. In this manner, systems of the type known in the related art take the data taken from the sensor array and process it, by a number of different means, in an attempt to determine the physical presence in the seat. The means used by the prior art methods vary from the use of simple computational methods to sophisticated, artificial neural networks. However, regardless of the types of sensors or the types of data processing employed, in each of these prior art vehicle seating occupancy sensing systems the sensor array or gird is integrated into the lower seat assembly as it is constructed.

The weight of an occupant sitting the vehicle seat causes the lower seat cushion to be compressed, which in turn causes a deflection of the sensors located in the sensor array. If the components of the seat are properly constructed in relation to each other, the compression of the cushion will adequately deflect the sensors to provide a good representative pattern of the occupant to the occupancy sensing system. It is important to note that, given this manner of seat construction, the occupancy sensing system must rely to some extent on the physical properties of the material used for the cushion. For example, foam materials are commonly employed in lower seat cushions and vary greatly, depending on their composition and intended application. When employed as seat cushioning materials, the foam cushion of the vehicle seat has certain physical properties and characteristics that can influence how the foam cushion deflects the sensors of the sensor array. By their nature, the foam materials used in seat cushions maintain a "memory" of their original shape and attempt to return to that shape after the force exerted by an occupant has been removed. The foam's ability to return to its original shape is a function of the foam's firmness and is referred to as the "hysteresis" of the foam. More specifically, the hysteresis of the foam is its relative delay in recovering its original shape.

Generally speaking, the hysteresis of the foam will increase the longer the foam has been deformed and the greater the deformation that was placed on the foam. This becomes important to occupancy sensing systems as an occupant leaves the seat and the vehicle remains in operation. For example, this situation may arise where a large male has occupied a seat for an extended period of time, such as a long trip. During this period, the seat foam has been substantially deformed as it responds to the passenger weight. Where the occupant exits the vehicle but the vehicle continues its trip, the sensor deflection caused by the slowly recovering foam seat cushion may cause the occupancy sensor system to falsely interpret the sensor readings as indicative of another occupant.

More specifically, in such an example, it will take a significant amount of time for the seat foam to overcome its hysteresis and completely return to it original shape. Typically, due to the resiliency and density of the foam cushioning materials commonly used, an exponential recovery of the foam will occur. Initially, a large portion of the foam recovery will occur rapidly with a continued but slower recovery to the original shape. Thus, even though the sensor array may be responsive to the departure of the individual, the sensors remain partially deflected due to the hysteresis and slow recovery of foam seat cushion.

This is problematic if an accident were to occur during the foam recovery period. If the vehicle is in an impact before the foam has time to completely recover from its hysteresis such that the occupant sensing system is unable to detect the empty seat, the supplemental restraint system would deploy the airbag on the empty seat. Additionally, it is possible that a much lighter adult or child could sit in the passenger seat after the large male exits. This means that the airbag could be allowed to improperly deploy against a small individual for whom it is actually desired to suppress or limit the airbag deployment. This would precipitate the same situation and possible injurious results that the occupancy sensing systems are attempting to prevent.

These issues relating to foam hysteresis are generally not a problem when an individual of a weight approximate to or heavier than the first individual takes the seat immediately after the first exits the vehicle. This second individual of the same or heavier weight would merely cause the foam to stay at the same deflection or cause deeper foam compression. However, if a lighter person occupies the seat immediately following a larger one, the recovery of the foam to the lighter individual's weight may be further delayed. Thus, even though the sensor array may be responsive to the departure of a first larger individual, the sensors remain temporarily deflected beyond the weight deflection of a second lighter individual due to the hysteresis and slow recovery of foam seat cushion.

Accordingly, there remains a need in the art for a method of predicting an empty vehicle seat for an occupancy sensing system, such that even with the hysteresis of the foam seat cushion deflecting the sensor array, the occupancy sensing system is aware that the seat is empty. Additionally, this need extends to not only predicting an empty seat condition but to determining the change in seat occupancy from a larger individual to a smaller one when applicable.

SUMMARY OF THE INVENTION

The disadvantages of the related art are overcome by the method of the present invention for predicting an empty vehicle seat for an occupancy sensing system having a vehicle seat with a sensor array. The method includes the steps of determining a first resultant value based on the change between the differences among a first series of sensor readings taken from the sensor array over a predetermined period of time, and determining a second resultant value based on the change between the differences among a second series of sensor readings taken from the sensor array over a different predetermined period of time. The method steps also include summing the first and second resultant values and determining if the summed value is negative and calculating the change in the first and second resultant values as a function of time to determine if the calculated change is greater than a predetermined value. Further, the method steps include classifying the vehicle seat as empty if the summed value is negative and calculated change is greater than the predetermined amount.

Thus, by constantly measuring the sensor array and determining if there is a change in the resultant values of the average sensor movement, the method of the present invention is able to detect a change in the sensor readings that is indicative of a vehicle seat that has become empty. Thus, the method of the present invention can predict an empty seat before the sensors can actually measure it. Accordingly, the present invention overcomes the limitations of the current methods of by providing a method of early prediction of an empty seat condition for a vehicle seat having an occupancy sensing system.

Other objects, features, and advantages of the present invention will be readily appreciated, as the same becomes better understood after reading the subsequent description taken in connection with the accompanying drawings.

DETAILED DESCRIPTION OF THE PREFERRED EMBODIMENT(S)

Figure 1:
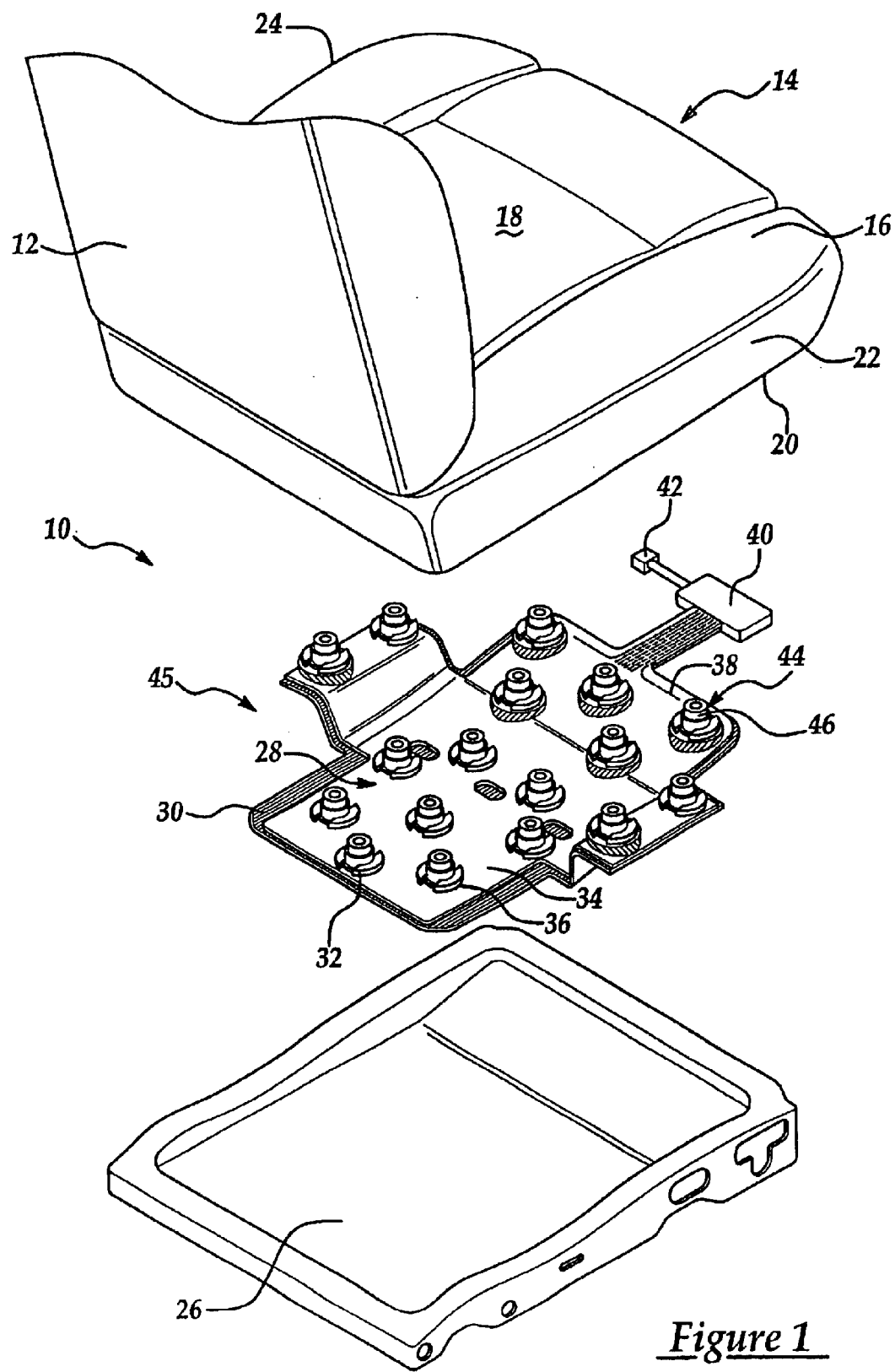
FIG. 1 is an exploded view of a vehicle seat having a sensor array used for occupancy classification of the type that may be employed with the method of the present invention to predict an empty seat condition.

Referring now to the drawings, where like numerals are used to designate like structure throughout the figures, an exploded view of one example of a vehicle seat assembly having an occupancy sensing system that may be employed with the method of the present invention is generally indicated at 10 in FIG. 1. The vehicle seat assembly 10 includes a seat back, generally indicated at 12, and a lower seat assembly, generally indicated at 14. The lower seat assembly 14 has a seat cushion 16 that defines an upper surface 18, and a lower surface 20 that is spaced from the upper surface 18. The upper surface 18 of the seat cushion 16 may be referred to as the "A-surface" and the lower surface 20 may be referred to as the "B-surface." The seat cushion 16 also defines an inboard side 22 and an outboard side 24. When an occupant (not shown) is supported on the lower seat assembly 14, the weight of the occupant will apply an axial load directed generally through the upper surface 18 of the seat cushion 16 toward the lower surface 20. Although the weight of the occupant will induce an axial as well as shear forces in the seat cushion 16, those having ordinary skill in the art will recognize that the primary load path of the occupant's weight will be substantially vertical from the upper surface 18 toward the lower surface 20, through the seat cushion 16.

The lower seat assembly 14 also includes a seat pan, generally indicated at 26. The seat pan 26 is generally disposed beneath the lower surface 18 to support the seat cushion 16. In turn, the seat pan 26 is operatively supported relative to the floor of the vehicle using any suitable structure of the type commonly known in the art, such as a seat track (not shown). In addition, the vehicle seat assembly 10 includes a vehicle occupant sensing system, generally indicated at 28. The vehicle occupant sensing system 28 is used for detecting a condition of the vehicle seat assembly 10, such as whether or not the vehicle seat assembly 10 is occupied, the size and weight classification of the occupant, or whether the occupant is sitting in a certain position.

The occupant sensing system 28 includes a circuit carrier tray, generally indicated at 30, that is supported by the seat pan 26. The circuit carrier tray 30 includes a plurality of resilient attachment tabs 32 extending upward toward the lower surface 20 of the lower seat cushion 16. Each attachment tab 32 is shaped like a partial ring that extends upward from the tray 30. In the preferred embodiment illustrated in FIG. 1, the attachment tabs 32 are arranged into mirror image pairs spaced intermittently about the tray 30. The tray 30 supports components of the vehicle occupant sensing system 28 as will be described in greater detail below.

The occupant sensing system 28 also includes a circuit carrier 34, which is disposed adjacent the lower surface 20 of the seat cushion 16. The tray 30 supports the circuit carrier 34, and the circuit carrier 34 includes a plurality of cutouts 36 each having a shape corresponding to the shape of the attachment tabs 32 of the tray 30 such that the tabs 32 can extend upward through the circuit carrier 34.

The occupant sensing system 28 also includes an electric circuit 38, which is supported by the circuit carrier 34. Specifically, the circuit carrier 34 is made of a thin nonconductive and corrosion-resistant material, and it encapsulates known electrical components that form the electric circuit 38. For instance, in one embodiment, a flexible printed circuit forms the circuit carrier 34 and electric circuit 38. The circuit 38 is electrically connected to a controller schematically illustrated at 40. The electric circuit 38 carries electric signals generated by the vehicle occupant sensing system 28 to the controller 40. The controller 40 is electrically attached to a restraint system, schematically illustrated at 42. The restraint system 42 can be of many types, such as an air bag system, and the controller 40 controls the restraint system 42 based on the signals delivered by the electric circuit 38. Although an airbag restraint system is discussed here, one having ordinary skill in the art will recognize that the type of restraint system 42 connected to the controller 40 does not limit the scope of the method of the present invention.

The occupant sensing system 28 shown in this example also includes a plurality of sensor assemblies generally indicated at 44 that are supported by the tray 30, below the lower surface 20 of the seat cushion 16. This plurality of sensor assemblies 44 collectively define a sensor array that is generally indicated at 45. As will be discussed in greater detail below, the particular sensor assemblies 44 shown herein have a relatively low profile and can collapse in a more compact manner than similar sensor assemblies of the prior art. Advantageously, these low profile sensor assemblies 44 allow an occupant to sit more comfortably upon the vehicle seat 10.

Figure 2:
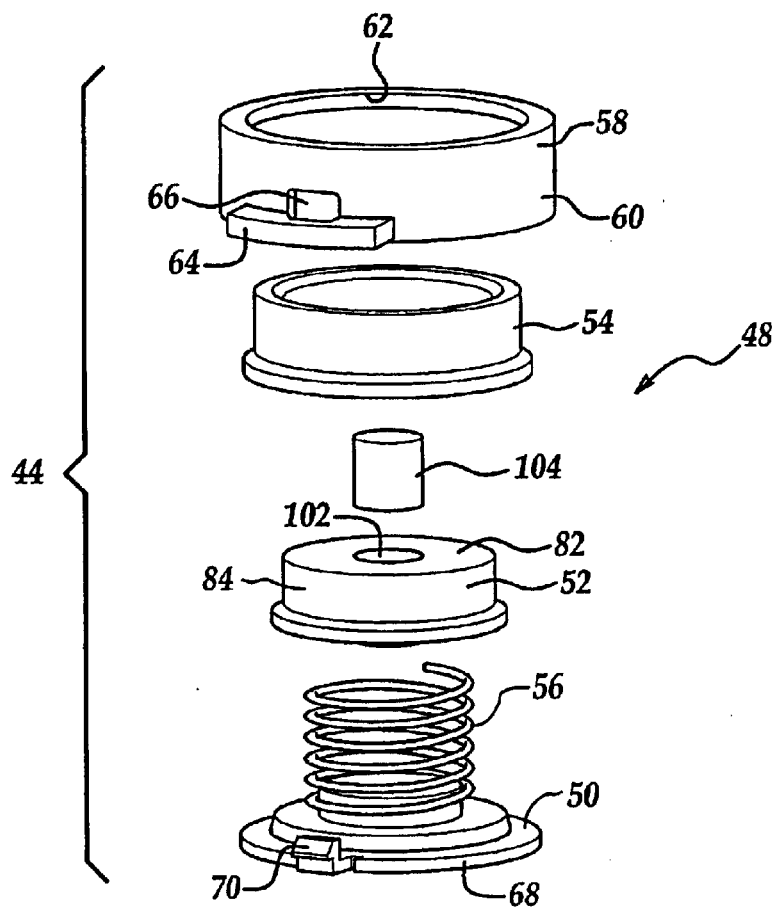
FIG. 2 is an exploded view of a sensor from the sensor array of FIG. 1.

A sensor, generally indicated at 46, is operatively fixed relative to each of the low profile sensor assemblies 32. The sensor 46 is in electrical communication with the electric circuit 38. One example of a low profile sensor assembly that may be employed with the method of the present invention is shown in greater detail in FIGS. 2 and 3. The low profile sensor assembly 44 generally includes a housing 48, having a base 50, an upper slide member 52, an intermediate guide member 54, and a base guide 58. The intermediate guide member 54 is disposed between the upper slide member 52 and the base 50. The upper slide member 52 and the intermediate guide member 54 are both supported for movement toward and away from the base 50. A biasing member 56 acts to bias the upper slide member 52 and intermediate guide member 54 away from the base 50.

The base guide 58 is shaped like a hollow tube so as to define a wall 60 with a bore 62 extending axially there through to allow for axial movement of the intermediate guide member 54. The base 50 also includes a retainer portion 68, which is substantially disc-shaped and is attached to one terminal end of the base guide 58. Two resilient tabs 70 extend radially and upward from an outer circumferential edge of the retainer portion 68. The tabs 70 are spaced 180° apart from each other. To connect the retainer portion 68 and the base guide 58, the retainer 68 moves axially into the bore 62 of the base guide 58 such that the tabs 70 of the retainer 68 snap into the apertures 66 of the base guide 58.

Figure 3:
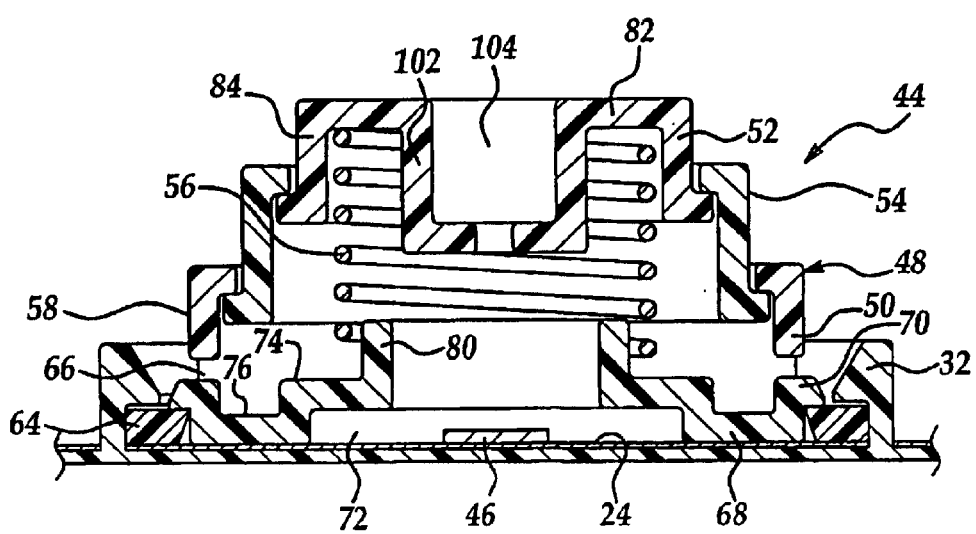
FIG. 3 is a cross-sectional view of the sensor of FIG. 2.

The upper slide member 52 includes an upper disc portion 82 and a support wall 84 extending axially downward from the outer circumference of the upper disc portion 82. The support wall 84 has a smaller diameter than the diameter of the intermediate guide member 54 such that the upper slide member 52 can move axially through the intermediate guide member 54. The biasing member 56 is disposed between the inner platform 78 of the base 50 and the upper disc portion 82 of the upper slide member 52. As shown in FIG. 3, the base 50 can be attached to the annular attachment tabs 32 that extend upwardly from the tray 30. Specifically, the hold-down flanges 64 of the base guide 58 can be positioned under the annular attachment tabs 32 of the tray 30 such that the annular attachment tabs 32 retain the hold-down flanges 64. To attach the base 50 to the tray 30, the bottom surface of the base 50 is positioned on the tray 30 such that the hold-down flanges 64 and the annular attachment tabs 32 are not aligned. Then, the base 50 is rotated about its axis until the hold-down flanges 64 move completely under the annular attachment tabs 32.

An annular void 72 is formed near the axial center of the base 50. In the embodiment illustrated in FIG. 3, the sensor 46 is a Hall effect sensor attached to the circuit carrier 34 between each pair of tabs 32 of the tray 30. The upper disc portion 82 of the upper slide member 52 includes a retainer portion 102 that accepts and retains an emitter 104, such as a magnet. The magnet thereby moves in axial relationship to the sensor 46 that is disposed upon and in electrical communication with the electric circuit 38. Thus, the weight of an occupant will deform the seat cushion 16 such that the lower surface 20 of the lower seat cushion 16 pushes the upper slide member 52 toward the base 50. As the upper slide member 52 moves, the sensor 46 detects an increase in magnetic flux density generated by the approaching emitter 104. In this way, the sensor 46 is operable to detect movement of the upper slide member 52 toward and away from the base 50. In turn, the sensor 46 generates a responsive signal indicative of the increase in flux density, and the controller 40 controls the restraint system 42 based on these signals. The example of a sensor assembly 44 illustrated here is described in greater detail in the co-pending application Ser. No. 10/748,536, entitled "Vehicle Occupant Sensing System Having a Low Profile Sensor Assembly," which is hereby incorporated in its entirety by reference. The electrical attachment between the sensor 46 and the circuit carrier 34 can be accomplished in the manner described in the co-pending application Ser. No. 10/748,514, entitled "Vehicle Occupant Sensing System and Method of Electrically Attaching a Sensor to an Electrical Circuit," which is also hereby incorporated in its entirety by reference.

In this manner, the sensor array assembly 45, through the combined output of the sensors 46 forms a portion of a vehicle seat occupancy sensing system that is associated with the supplemental restrain system (SRS) 42. The sensor array 45 is utilized to provide data to the control system of the SRS. The SRS control system may employ a neural net (NN). In this case, the control system uses the pattern generated by the sensor array 45, based on the occupancy of the vehicle seats as recognized by the NN, to activate or suppress the deployment of the airbags. More specifically, when a physical presence occupies the vehicle seat, the collective sensor outputs of the sensors 46 in the sensor array 45 produce a particular pattern that the NN recognizes as belonging to a certain group of patterns (i.e. a cluster or classification). If the pattern is one that falls into a classification for which it is desirable to deploy the airbag in the event of an impact, the SRS control system will be prepared to do so. If the pattern is one that falls into a classification for which it has been determined that it is not desirable to deploy the airbag in the event of an impact, the SRS control system will take steps to suppress the deployment. Furthermore, the classification of the recognized pattern also provides the SRS control system with the capability to control the rate and percentage of airbag deployment if the SRS system is so designed.

In regard to the present invention, the seat cushion 16 is constructed of a foam-type material that provides physical support and seating comfort to the occupant. As previously discussed, the foam material has the inherent physical property of hysteresis, which is the delay of the foam in returning to its original shape when it is no longer depressed. The hysteresis of the foam increases where the depression formed in the seat is deeper and the longer the foam remains depressed. The sensors 46 of the sensor array assembly 45 in the occupancy sensing system 28 rely on the relative depression of the foam seat cushion 16 to represent a pattern indicative of the size, shape, and position of the occupant. Thus, any delay in the foam returning to its empty seat shape is problematic if the vehicle remains in use after the seat becomes unoccupied. Further, if the seat becomes occupied by a smaller and lighter individual immediately after a larger and heavier one, the occupancy sensing system may improperly classify the new occupant.

The present invention provides the method steps necessary for the occupancy sensing system to predict when the seat has emptied before the foam seat cushion fully completes its slow return to its original shape. The method of the present invention for predicting an empty seat condition in a vehicle seat having an occupancy sensing system 28 with a sensor array 45, is generally indicated at 200 in FIG. 4. The method is initiated at the start entry block 202. At process block 204 a first resultant value based on the change between the differences among a first series of sensor readings taken from the sensor array over a first predetermined period of time is determined. At process block 206 a second resultant value based on the change between the differences among a second series of sensor readings taken from the sensor array over a second predetermined period of time is determined.

Using the first and second resultant values, decision block 208 sums them to determine if the summed value is negative. The determination that the summed value of the first and second resultants is negative is indicative of a sensor array in which the sensors have been deflected and are moving to a lesser-deflected position. If this is not true, the "No" path is taken and the method returns to process block 204 to re-initiate the determination of new resultants. This may be an indication that the seat is currently empty, in which the classification of "empty seat" is determined by a higher method in the NN classification process. However, it most commonly indicates the condition that the seat is occupied and remains occupied during this pass through the method steps.

If the determination at decision block 208 is true, the "Yes" path is taken to decision block 210. Decision block 210 calculates the change in the first and second resultant values as a function of time to determine if the calculated change is greater than a predetermined value. This determination in the change in resultant values is indicative of a sensor array in which the sensors not only have been deflected and are moving to a lesser-deflected position, but that the sensors are continuing to move toward an unloaded, or empty position. This generally relates to a continued tracking of the sensor movements such that it can be graphically plotted on a curve having a negative slope. The necessity of having a predetermined value as a threshold ensures that the method steps do not make this determination under transient seating conditions. For example, when a vehicle travels on uneven pavement, the occupant may be caused to move up and down in the seat slightly from the road vibration. Having a predetermined threshold for the change in resultant values prevents concluding that an empty seat condition exists as the seat unloads slightly during the period that the occupant rises in the seat. Likewise, if an occupant repositions in the seat, the effect may at first cause decision block 208 to determine a negative change in the resultants but decision block 210 will determine that the change is momentary and not trending toward an "empty seat" condition. Thus, if the decision block 210 determination is not true, the "No" path is taken and the method returns to process block 204 to re-initiate the determination of new resultants.

If the determination at decision block 210 is true, the "Yes" path is taken to decision process block 212 in which the vehicle seat is classified as empty if the summed value is negative and the calculated change is greater than the predetermined amount. This classification is passed on to the higher-level method that is beyond the scope of the present invention but will be otherwise determining the seat occupancy through the NN interpretation and processing of the data from the sensor array 45. The higher-level method will employ the "empty seat" classification determined by the present invention to override any existing occupancy classification that is incorrectly based on the slow hysteresis return of the foam seat cushion to its original shape. The higher level method of NN processing of the sensor data and the classification of the occupancy of the vehicle seat with which the present invention is employed is described in greater detail in the co-pending application, Ser. No. 10/748,504, Entitled "Method Of Occupancy Classification In A Vehicle Seat," which is hereby incorporated in its entirety by reference.

It should be appreciated that the method of the present invention is repetitive and that in an ongoing series of resultant values, the method will eventually determine by the above-mentioned steps that the seat has apparently become empty. In this regard, after classifying the vehicle seat as empty as illustrated process step 212, the method of the present invention continues to be repeated through the return block 214 and start entry block 202. Thus, the method will confirm the empty seat condition to the higher-level method.

Figure 4:
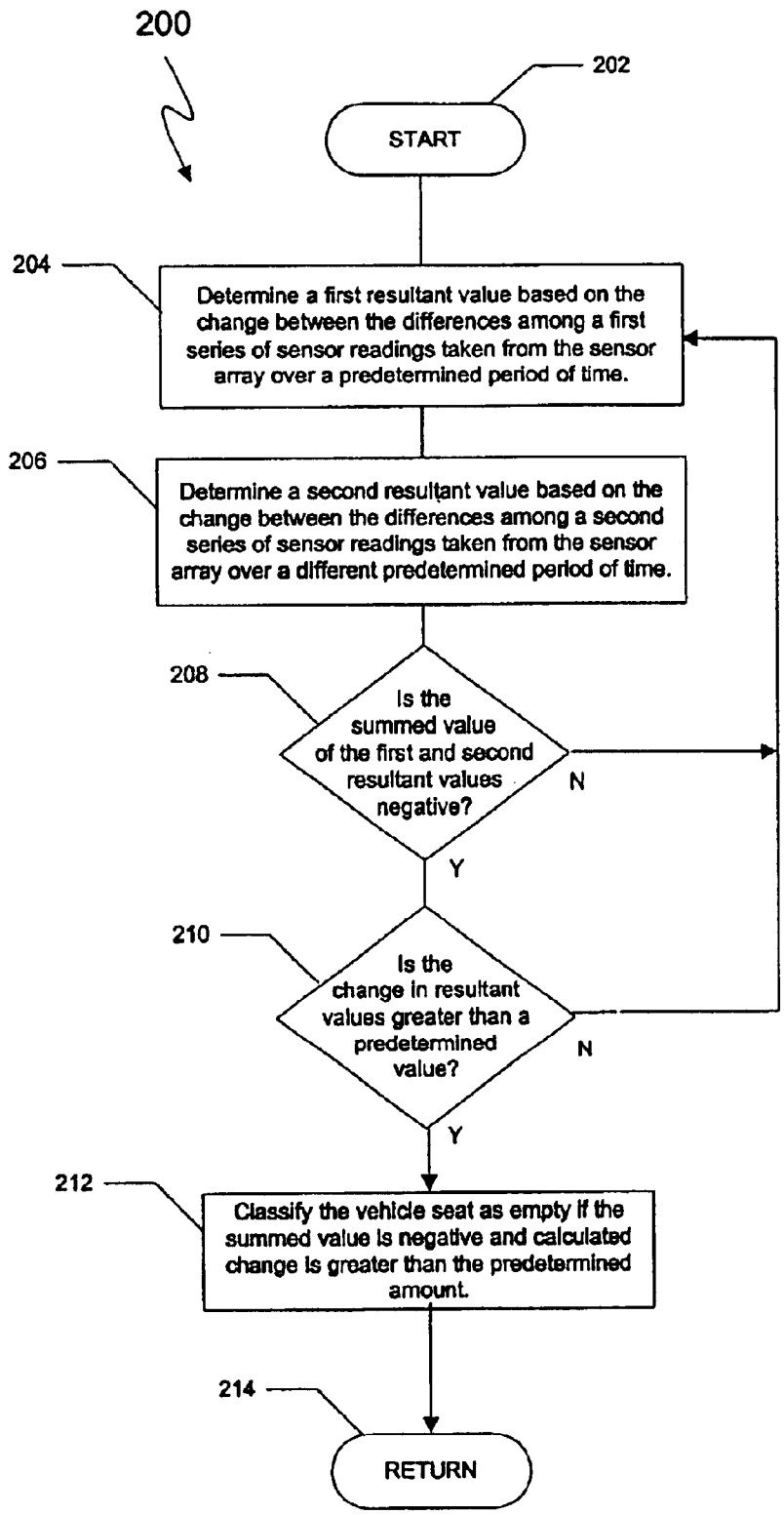
FIG. 4 is a block diagram flowchart of the method of the present invention for predicting an empty seat condition.
Figure 5:
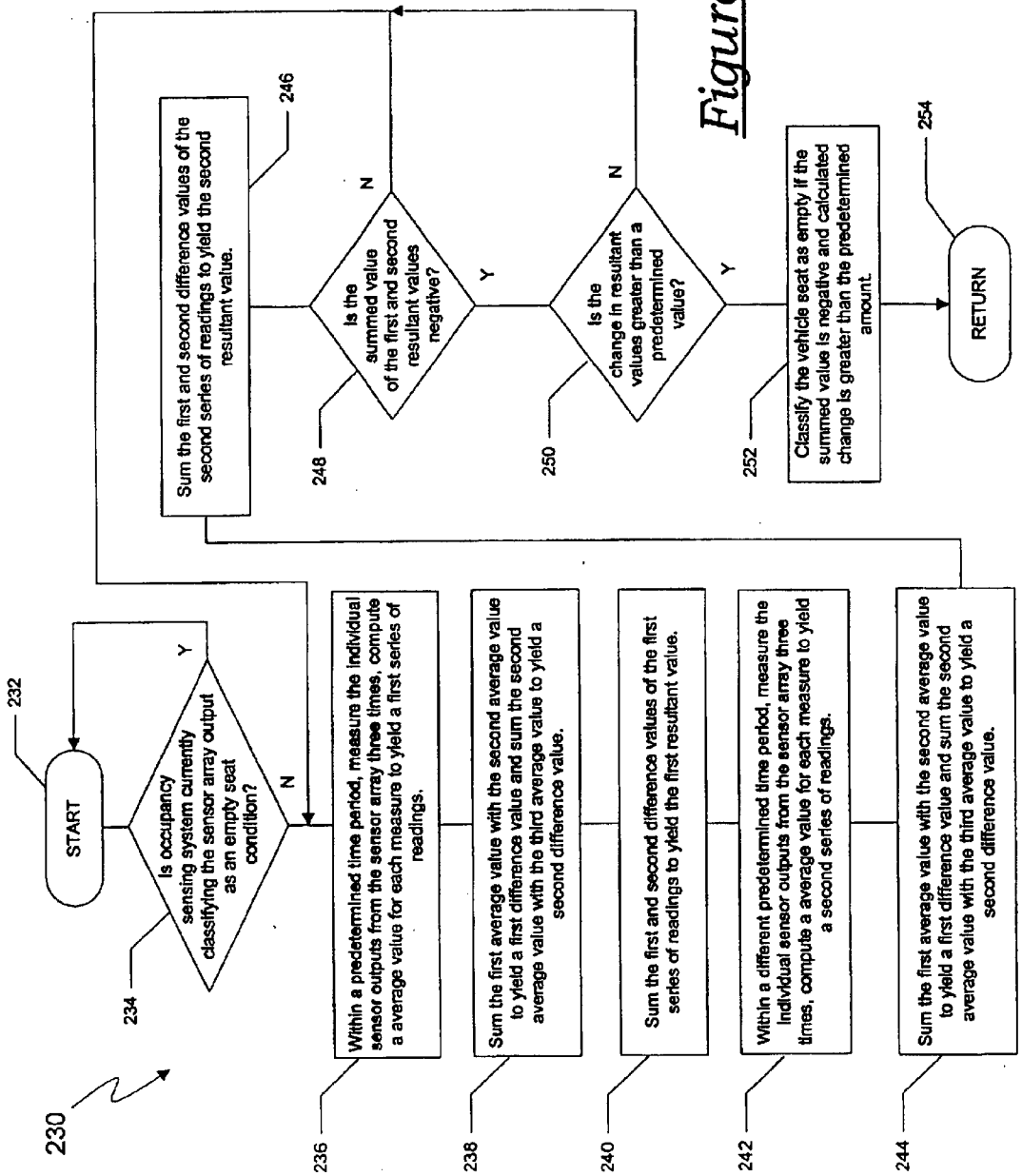
FIG. 5 is a detailed block diagram flowchart of the method of the present invention for predicting an empty seat condition.

More specifically, and by way of non-limiting example, the method steps generally indicated in FIG. 4 may include those depicted in detail in FIG. 5. These more specific steps of the method are generally indicated at 230 and begin at the start entry block 232. The detailed method of the present invention includes a first step at decision block 234, which determines if the higher-level method controlling the occupancy sensing system is classifying the sensor array output as indicative of an empty seat condition. If this condition is true, the "Yes" path is taken and the method is reinitiated. This occurs to save operating overhead in the processing of the method of the present invention. More precisely, if it has been determined that the seat is already empty by the higher level method, meaning that the sensor array reflects that the foam seat cushion is in its original shape, there is no need to work through the method until the seat first becomes occupied. If the occupancy sensing system is classifying the sensor array output as indicative of a occupied seat, then the "No" path is taken so that the method will begin and be able to predict the seat empty condition before the foam seat cushion recovers.

Following the "No" path from decision block 234 takes the method to process block 236. In process block 236, for a first predetermined time period, the individual sensor outputs from the sensor array are measured three times and an average value for each measure is computed to yield a first series of readings. Once the three average values are determined from the sensor array (45) output, process block 238 sums the first average value with the second average value to yield a first difference value, and sums the second average value with the third average value to yield a second difference value for the first series of readings. Then, process block 240 sums the first and second difference values to yield a first resultant value. In other words, the outputs of all the sensors of the array are reduced to an average value three different times during a specified time period. Then, a difference value, or change between each of the averages is determined and the differences are summed to determine a first resultant value. It should be appreciated that the resultant value is indicative of a short-term trend of the change in average values of the sensor readings. As will be described below, this is used with additional sensor information over time to determine if the sensors 46 of the sensor array 45 are slowly moving back toward an empty seat condition but are being delayed by the hysteresis of the foam cushion. In this manner, the method of the present invention is able to predict that an empty seat condition exists before the sensor array 45 can physically detect it.

In that regard, process blocks 242, 244, and 246 take a similar series of process steps over a second predetermined time period, such that a second resultant value will be produced for a second series of sensor readings. More specifically, in process block 242 during a second predetermined time period, the individual sensor outputs from the sensor array are measured three times and an average value for each measure is computed to yield a second series of readings. Once the three average values for the second series of sensor readings are determined from the sensor array (45) output, process block 244 sums the first average value with the second average value to yield a first difference value, and sums the second average value with the third average value to yield a second difference value. Then, process block 246 sums the first and second difference values from the second series of sensor readings to yield a first resultant value. In other words, as with the first series of sensor readings, the output of all the sensors of the array are reduced to an average value three different times during a second predetermined time period. Then, a difference value, or change between each of the averages is determined and the differences are summed to determine a second resultant value.

Once the first and second resultant values have been determined, they are used to further determine if the sensor array 45 is showing a trend of the sensors moving in the direction of an empty seat condition. This is accomplished by the decision blocks 248 and 250. Using the first and second resultant values, decision block 248 sums them to determine if the summed value is negative. As discussed above in regard to decision block 208 in FIG. 4, the determination that the summed value of the first and second resultants is negative is indicative of a sensor array in which the sensors have been deflected and are moving to a lesser-deflected position. If this is not true, the "No" path is taken and the method returns to process block 236 to re-initiate the determination of new resultants. This generally means that the seat is currently empty, in which the classification of "empty seat" is determined by a higher method in the NN classification process, or the seat is occupied and remains occupied during this pass through the method steps.

If the determination at decision block 248 is true, the "Yes" path is taken to decision block 250. Decision block 250 calculates the change in the first and second resultant values as a function of time to determine if the calculated change is greater than a predetermined value. This determination in the change in resultant values is indicative of a sensor array in which the sensors not only have been deflected and are moving to a lesser-deflected position, but that the sensors are continuing to move toward an unloaded, or empty position. As previously discussed, this generally relates to a continued tracking of the sensor movements, such that it can be graphically plotted on a curve having a negative slope. Using the predetermined value as a threshold ensures that the method steps do not make this determination under transient seating conditions, as mentioned above.

If the determination at decision block 250 is true, the "Yes" path is taken to decision process block 252 in which the vehicle seat is classified as empty if the summed value is negative and the calculated change is greater than the predetermined amount. This classification is passed on to the higher-level method that is beyond the scope of the present invention but will be otherwise determining the seat occupancy through the NN interpretation and processing of the data from the sensor array 45. The higher-level method will employ the "empty seat" classification determined by the present invention to override any existing occupancy classification that is incorrectly based on the slow hysteresis return of the foam seat cushion to its original shape.

Figure 6:
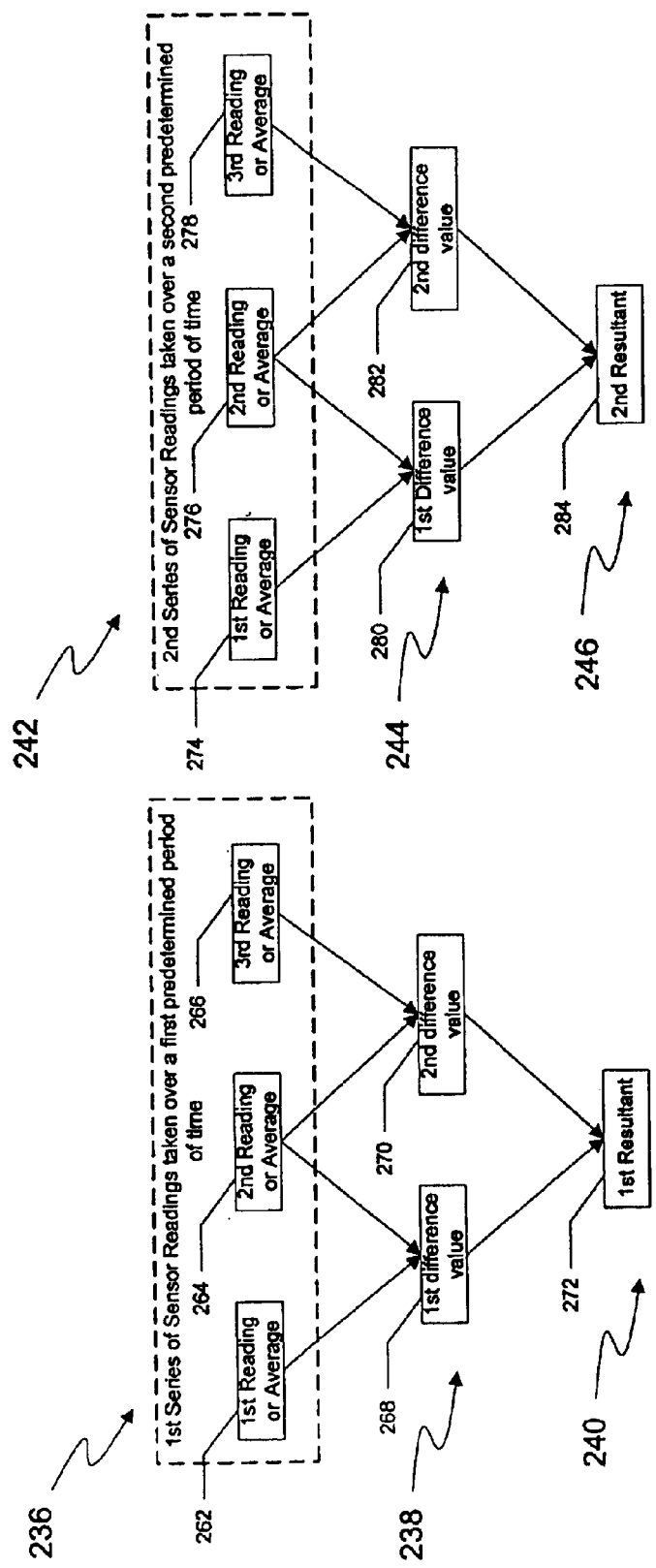
FIG. 6 is a block diagram flowchart illustrating several steps of the method as illustrated in FIG. 5 for predicting an empty seat condition in greater detail.

To better illustrate the determination of the first and second resultants, FIG. 6 is provided to highlight process steps 236 through 246 in detail. More specifically, process block 236 in FIG. 5 is generally indicated in FIG. 6 and includes the following individual steps as illustrated. At 262 in FIG. 6, the individual sensor outputs from the sensor array are measured and computed to yield a first average value of the sensor readings in the first series of sensor readings. At 264, the individual sensor outputs from the sensor array are re-measuring and computed to yield a second average value in the first series of sensor readings. At 266, the individual sensor outputs from the sensor array are re-measuring and computed to yield a third sensor reading in the first series of sensor readings.

Further, process block 238 in FIG. 5 is generally indicated in FIG. 6 and includes the following individual steps. At 268 for the first series of sensor readings, the first average value 262 is summed with second average value 264 to yield the first difference value 268 and the second average value 264 is then summed with the third average value 266 to yield the second difference value 270. Process block 240 of FIG. 5 is also generally indicated in FIG. 6, in which the first difference value for the first series of sensor readings at 268 is summed with the second difference values at 270 to yield the first resultant value and 272.

Likewise, for the second series of sensor readings, process block 242 is generally indicated in FIG. 6 and includes the following steps. At 274, the individual sensor outputs measurement from the sensor array is computed to yield a first average value of the sensor readings. At 276, the individual sensor outputs from the sensor array are re-measured and computed to yield a second average value in the second series of sensor readings. At 278, the individual sensor outputs from the sensor array are re-measured and computed to yield a third average value in the second series of sensor readings. Further, process step 244 of FIG. 5 is generally indicated in FIG. 6 and includes the following individual steps. The first average value 274 is summed with second average value 276 to yield the first difference value 280 and the second average value 276 is then summed with the third average value 278 to yield the second difference value 282. Further, process step 246 of FIG. 5 is generally indicated in FIG. 6 where for the second series of readings, the first difference value 280 is summed with second difference value 282 to yield the second resultant value 284.

It should be appreciated that determining the average sensor values to ultimately yield the first and second resultant values need not be limited to two separate and distinct time periods. Since the goal is to determine if a trend in the change of the average sensor readings is occurring that is indicative of the sensors moving to the empty seat position, the sensor readings may also be taking in running measurement. In other words, once a first, second, and third sensor measurement is taken and averaged, rather than entering into a second predetermined time period for a second series of sensor reading, an additional fourth sensor measurement can simply be taken and the difference value determinations can continue between these averages. More specifically, FIG. 7 is provided to illustrate how this alternate manner of taking sensor reading may be incorporated into the method of the present invention.

Figure 7:
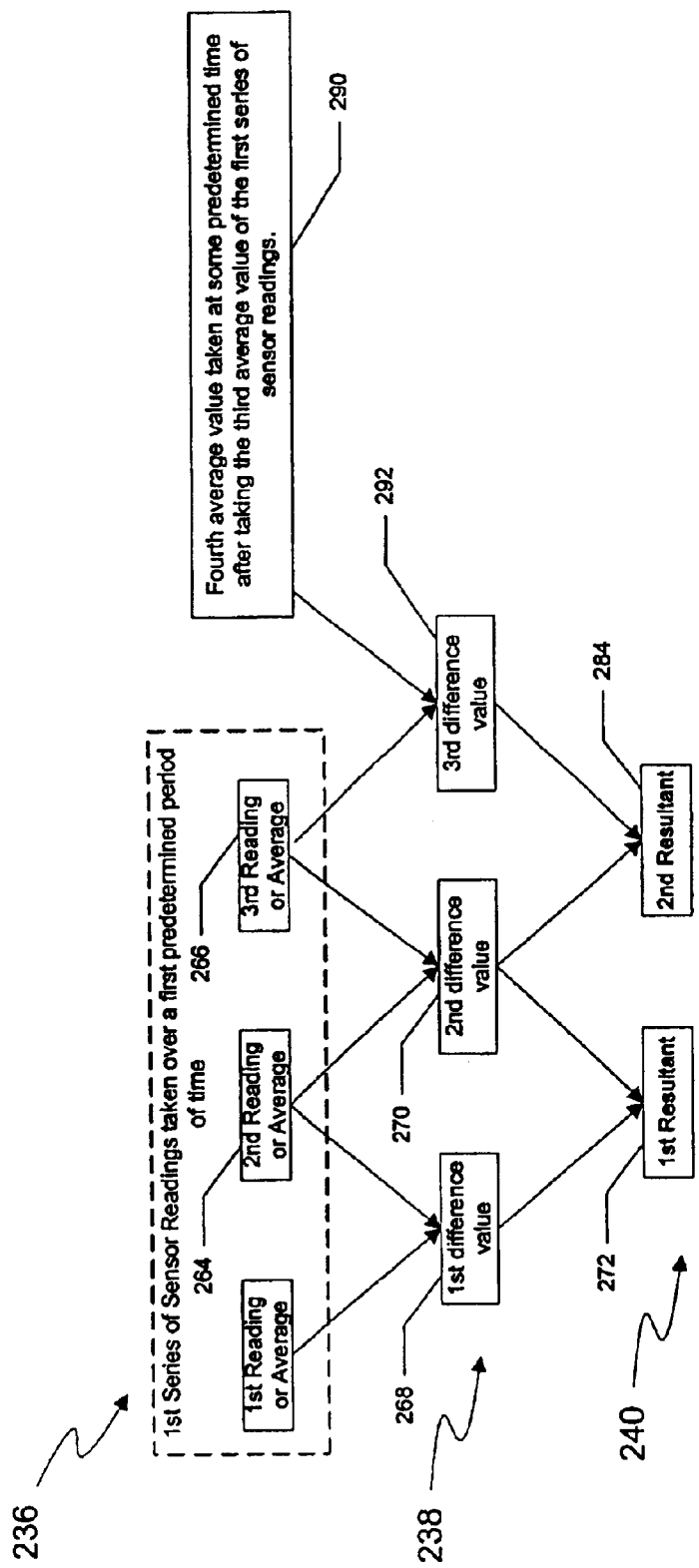
FIG. 7 is a block diagram flowchart illustrating one variation of the method illustrated in FIG. 6

With the method steps illustrated in FIG. 6 in mind, FIG. 7 illustrates process steps 236, 238 and 240 to yield the first resultant value 272. However, a fourth sensor reading 290 is taken at some predetermined time after the third reading. Thus, the individual sensor outputs from the sensor array are simply re-measured and computed to yield a fourth average value of the sensor readings. Then, the third average value 266 is summed with the fourth average value 290 to yield a third difference value 292, and the second difference value 270 is summed with the third difference value 292 to yield the second resultant value 284. It should be further appreciated that this process is repetitive, such that once the seat is first occupied, the method continues to take sensor readings, computes their averages, and determines further resultant values. Thus, an occupied seat is constantly being monitored to determine if the seat has emptied but the foam cushion has yet to return to its original shape.

It should be appreciated as previously mentioned that the method of the present invention is repetitive and that in an ongoing series of resultant values the method will eventually determine by the above-mentioned steps that the seat has apparently become empty. In this regard, after classifying the vehicle seat as empty as illustrated process step 252 of FIG. 5, the method of the present invention continues to be repeated through the return block 254 to the start entry block 232. Thus, the method will confirm the empty seat condition to the higher-level method.

Accordingly, by constantly measuring the sensor array and determining if there is a change in the resultant values of the average sensor movement, the method of the present invention overcomes the limitations of the prior art occupancy sensing systems that cannot detect an empty seat until the foam cushion recovers from its hysteresis. The method of the present invention is able to detect small changes in the sensor readings that are indicative of a vehicle seat that has become unoccupied and provides early prediction of an empty seat condition to the higher-level control system for a vehicle seat having an occupancy sensing system.

The invention has been described in an illustrative manner. It is to be understood that the terminology which has been used is intended to be in the nature of words of description rather than of limitation. Many modifications and variations of the invention are possible in light of the above teachings. Therefore, within the scope of the claims, the invention may be practiced other than as specifically described.

I claim:

1. A method of predicting an empty seat condition for a vehicle seat having an occupancy sensing system with a sensor array assembly, said method including the steps of:

determining a first resultant value based on the change between the differences among a first series of sensor readings taken from the sensor array over a first predetermined period of time;

determining a second resultant value based on the change between the differences among a second series of sensor readings taken from the sensor array over a second predetermined period of time;

summing said first and second resultant values to determine if the summed value is negative;

re-determining the first and second resultant values and re-summing if the summed value is positive;

calculating the change in the first and second resultant values as a function of time to determine if the calculated change is greater than a predetermined value if the summed value is negative; and classifying the vehicle seat as empty if the summed value is negative and calculated change is greater than the predetermined amount.

2. A method as set forth in claim 1 wherein the step of determining if the calculated change between the first and second resultant values is greater than a predetermined value further includes the step of:

re-calculating the change between the first and second resultant values until the change is greater than the predetermined value.

3. A method as set forth in claim 1 wherein the step of determining a first resultant value further includes the steps of:

measuring the individual sensor outputs from the sensor array;

computing a first average value of the sensor readings to yield a first sensor reading in the first series of sensor readings;

re-measuring the individual sensor outputs from the sensor array;

computing a second average value of the sensor readings to yield a second sensor reading in the first series of sensor readings;

re-measuring the individual sensor outputs from the sensor array;

computing a third average value of the sensor readings to yield a third sensor reading in the first series of sensor readings.

4. A method as set forth in claim 3 wherein the step of determining a first resultant value further includes the step of summing the first average value with the second average value to yield a first difference value.

5. A method as set forth in claim 4 wherein the step of determining a first resultant value further includes the step of summing the second average value with the third average value to yield a second difference value.

6. A method as set forth in claim 5 wherein the step of determining a first resultant value further includes the step of summing the first and second difference values to yield the first resultant value.

7. A method as set forth in claim 1 wherein the step of determining a second resultant value further includes the steps of:

measuring the individual sensor outputs from the sensor array;

computing a first average value of the sensor readings in the second series of readings to yield a first sensor reading;

re-measuring the individual sensor outputs from the sensor array;

computing a second average value of the sensor readings in the second series of readings to yield a second sensor reading;

re-measuring the individual sensor outputs from the sensor array;

computing a third average value of the sensor readings in the second series of readings to yield a third sensor reading.

8. A method as set forth in claim 7 wherein the step of determining a second resultant value further includes the step of summing the first average value in the second series of sensor readings with the second average value to yield a first difference value.

9. A method as set forth in claim 8 wherein the step of determining a second resultant value further includes the step of summing the second average value in the second series of sensor readings with the third average value to yield a second difference value.

10. A method as set forth in claim 9 wherein the step of determining a second resultant value further includes the step of summing the first and second difference values of the second series of sensor readings to yield the second resultant value.

11. A method as set forth in claim 9 wherein the step of summing the second average value of the second series of sensor readings with the third average value of the second series of sensor readings to yield a second difference value further includes the steps of:

substituting the third average value of the first series of sensor readings for the second average value of the second series of sensor readings and substituting a fourth average value taken at some predetermined time after taking the third average value for the first series of sensor readings as the third average value of the second series of sensor readings.

12. A method as set forth in claim 1 which includes a first step of determining if the occupancy sensing system is classifying the sensor array output as indicative of an empty seat condition and reinitiating the method if the occupancy sensing system is classifying the sensor array output as indicative of an empty seat.

13. A method as set forth in claim 1 wherein the step of classifying the vehicle seat as empty further includes the step of reinitiating the method if the summed value is negative and the calculated change is greater than the predetermined amount to confirming an empty seat condition.

14. A method of predicting an empty vehicle seat for an occupancy sensing system having a vehicle seat with a sensor array, said method including the steps of:

measuring the individual sensor outputs from the sensor array;

computing a first average value of the sensor readings to yield a first sensor reading;

re-measuring the individual sensor outputs from the sensor array;

computing a second average value of the sensor readings to yield a second sensor reading;

re-measuring the individual sensor outputs from the sensor array;

computing a third average value of the sensor readings to yield a third sensor reading;

re-measuring the individual sensor outputs from the sensor array;

computing a fourth average value of the sensor readings to yield a fourth sensor reading;

summing the first average value with the second average value to yield a first difference value;

summing the second average value with the third average value to yield a second difference value;

summing the third average value with the fourth average value to yield a third difference value;

summing the first and second difference values to yield a first resultant value;

summing the second and third difference values to yield a second resultant value;

summing said first and second resultant values and determining if the summed value is negative;

calculating the change in the first and second resultant values as a function of time to determine if the calculated change is greater than a predetermined value; and classifying the vehicle seat as empty if the summed value is negative and calculated change is greater than the predetermined amount.

15. A method as set forth in claim 14 that includes a first step of determining if the occupancy sensing system is classifying the sensor array output as indicative of an empty seat condition and reinitiating the method if the occupancy sensing system is classifying the sensor array output as indicative of an empty seat.

16. A method as set forth in claim 14 wherein the step of classifying the vehicle seat as empty further includes the step of reinitiating the method if the summed value is negative and the calculated change is greater than the predetermined amount to confirming an empty seat condition.

* * * * *